No. 873,672. PATENTED DEC. 10, 1907.
W. J. LOUDENSLAGER & J. E. MORRIS.
L. L. MORRIS, EXECUTOR OF J. E. MORRIS, DEC'D.
COOKING UTENSIL.
APPLICATION FILED MAY 4, 1907.
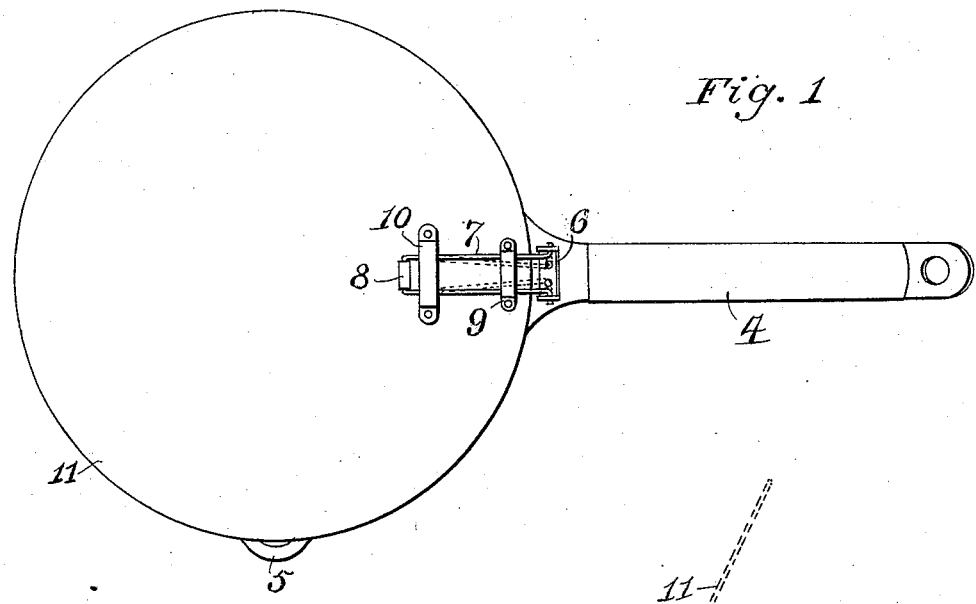
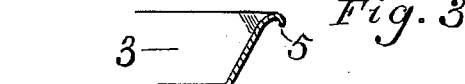
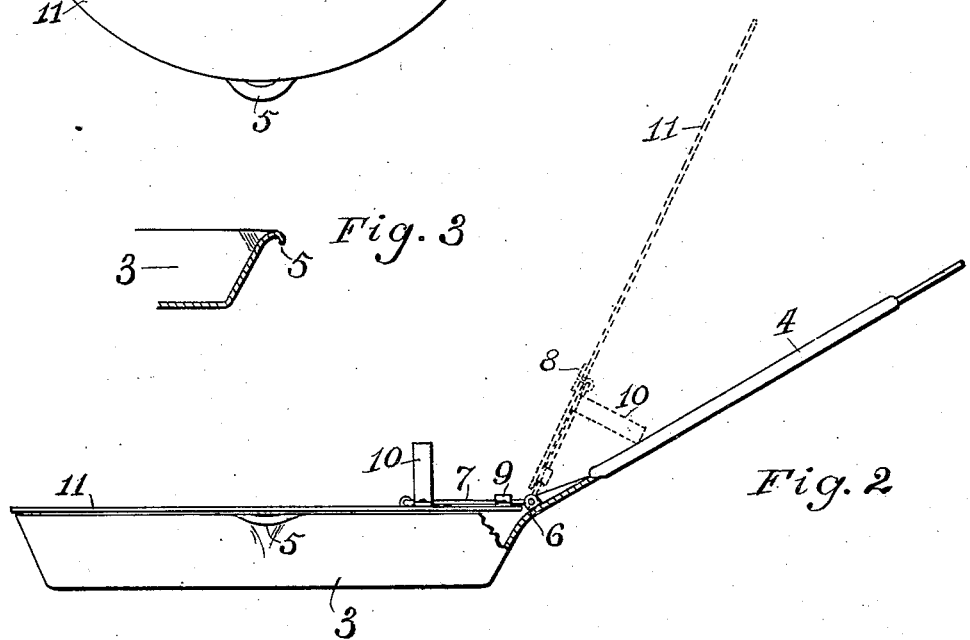
Witnesses
Gertrude Manning.
Inventors
William J. Loudenslager
James E. Morris
By Delbert H. Decker
Attorney

UNITED STATES PATENT OFFICE.

WILLIAM J. LOUDENSLAGER AND JAMES E. MORRIS, OF JACKSONBURG, WEST VIRGINIA; L. L. MORRIS EXECUTOR OF SAID JAMES E. MORRIS, DECEASED.

COOKING UTENSIL.

No. 873,672.

Specification of Letters Patent.

Patented Dec. 10, 1907.

Application filed May 4, 1907. Serial No. 371,837.

*To all whom it may concern:*

Be it known that we, WILLIAM J. LOUDENSLAGER and JAMES E. MORRIS, citizens of the United States, and residents of Jacksonburg, county of Wetzel, and State of West Virginia, have invented new and useful Improvements in Cooking Utensils, of which the following is a specification.

This invention, which relates to improvements in cooking utensils, has for its object the provision of a detachable cover and a novel spout or lip.

To this end the invention consists in the formation and combination of parts substantially as hereinafter described and claimed.

In the accompanying drawing, which forms a part of this specification, Figure 1 represents in plan an ordinary skillet, to which has been applied the features of this invention; Fig. 2 is a side elevation thereof, a part being broken away for the purpose of better illustrating the invention; and Fig. 3 is a vertical section through the portion of the skillet, on which the spout is formed.

While the invention is applicable to cooking utensils of various sorts and for various uses, it is especially applicable to a skillet or frying pan, and the drawings show this application of the invention. Therein 3 indicates the body of the skillet and 4 its handle. These parts are of the ordinary type to be found on the market today. To facilitate the pouring out of the contents of the skillet, the edge of the spout is prolonged and turned downward and preferably slightly inward, as is clearly seen in Fig. 3 at 5. This recurved lip formed upon the spout prevents grease from running down the side of the skillet onto the stove.

In using a skillet, particularly for frying, it is necessary to cover it, and a removable cover, such as must be deposited on the table or some other place, while stirring the contents of the skillet, soils that upon which it is deposited. This invention obviates this difficulty by providing a novel hinge for the cover 11, such that the cover may be turned back and the contents of the skillet inspected or manipulated as desired. The hinge is also so constructed that the cover may be readily removed when its use is not required and also for washing the utensil. One form, in which this hinge may be constructed, is illustrated. A clip, as 6, having up-turned perforated ends is preferably riveted to the base of the handle 4.

A stout spring-metal wire, preferably bent into U-shape, as seen at 7, is secured to the cover in any suitable way, as by a sheet metal staple 8, whose ends may pass through a slit in the cover and be bent away from one another on the underside of the cover, as indicated in Fig. 2. A keeper, as 9 is placed over the free ends of the wire 7 and secured to the cover in any suitable manner, as by rivets. The ends of the wire 7 are bent outwardly and form the hinge pintles for insertion in the perforations on the ends of clip 6. To attach the cover to the skillet, the ends of the wire 7 are pressed towards one another into the position indicated by dotted lines, Fig. 1, and the curved ends thereof inserted in the perforations of clip 6. The cover is readily removed by again pressing these ends of the wire 7 together and withdrawing them from said perforations. The handle of the cover, indicated at 10, is preferably so placed and made of such height that when the cover is turned back, said handle will rest upon the handle 4 of the skillet and maintain the cover in substantially the position indicated in Fig. 2. This construction provides for the draining of such liquid as there may be upon the underside of the cover, back into the skillet.

The invention claimed is:—

The combination with a skillet having a projecting handle, of a clip provided with perforated up-turned ends secured to the base of the handle, and a cover having secured thereon a U-shaped spring metal wire having outwardly turned ends adapted to be inserted into and withdrawn from the perforations in said clip, as and for the purpose set forth.

In testimony whereof we have signed our names to this specification in the presence of two subscribing witnesses.

WILLIAM J. LOUDENSLAGER.
JAMES E. MORRIS.

Witnesses:
I. W. JOHNSTON,
H. R. JOHNSTON.